US012625459B2

(12) United States Patent
Okayasu et al.

(10) Patent No.: US 12,625,459 B2
(45) Date of Patent: May 12, 2026

(54) IMAGE FORMING APPARATUS

(71) Applicant: CANON KABUSHIKI KAISHA, Tokyo (JP)

(72) Inventors: Kohei Okayasu, Shizuoka (JP); Shuma Hiasa, Kanagawa (JP); Masaki Tanaka, Kanagawa (JP); Satoshi Nishida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/982,662

(22) Filed: Dec. 16, 2024

(65) Prior Publication Data

US 2025/0199458 A1 Jun. 19, 2025

(30) Foreign Application Priority Data

Dec. 19, 2023 (JP) ................................ 2023-213485

(51) Int. Cl.
*G03G 15/00* (2006.01)
*G03G 21/16* (2006.01)

(52) U.S. Cl.
CPC ..... *G03G 21/1647* (2013.01); *G03G 21/1633* (2013.01)

(58) Field of Classification Search
CPC ............... G03G 15/00; G03G 21/1633; G03G 21/1647; G03G 21/1883; G03G 21/1892
USPC ................................ 399/107, 108, 110, 117
See application file for complete search history.

(56) References Cited

U.S. PATENT DOCUMENTS

| | | | | |
|---|---|---|---|---|
| 8,145,096 | B2 | 3/2012 | Kawanami et al. | |
| 9,081,359 | B2 * | 7/2015 | Hoashi | G03G 21/1853 |
| 9,442,457 | B2 * | 9/2016 | Maeda | G03G 21/1623 |
| 10,496,034 | B2 * | 12/2019 | Takano | G03G 21/1842 |

FOREIGN PATENT DOCUMENTS

| | | | |
|---|---|---|---|
| JP | 2005077440 | * | 3/2005 |
| JP | 2009128506 | A | 6/2009 |
| JP | 2014066840 | A | 4/2014 |
| JP | 2017161757 | A | 9/2017 |

* cited by examiner

*Primary Examiner* — Hoan H Tran
(74) *Attorney, Agent, or Firm* — ROSSI, KIMMS & McDOWELL LLP

(57) ABSTRACT

An image forming apparatus including: an apparatus main body having an opening; a moving member holding a cartridge and movable through the opening between a housed position and an exposed position; an opening/closing portion configured to be rotatable between an open position and a closed position, and includes a first support portion and a second support portion that support the moving member located at the exposed position; and a metal member that is attached to the opening/closing portion and faces the moving member in a state in which the moving member is located at the exposed position and supported by the first support portion and the second support portion. The metal member is placed between the first support portion and the second support portion in a rotation axis direction of the opening/closing portion.

15 Claims, 12 Drawing Sheets

IMAGE FORMING APPARATUS

BACKGROUND OF THE INVENTION

Field of the Invention

The present invention relates to an image forming apparatus.

Description of the Related Art

Conventionally, an image forming apparatus is known that has a configuration in which multiple cartridges are arranged on a moving member such as a movable tray, and the moving member is pulled out to the outside of the apparatus main body so that the cartridges can be attached or detached.

Japanese Patent Application Publication No. 2009-128506 discloses a support portion that supports a moving member, which holds cartridges, when the moving member is pulled out to the outside of the apparatus main body.

SUMMARY OF THE INVENTION

When the moving member pulled out outside the apparatus main body is stably supported, the user can stably attach and detach a cartridge to and from the moving member.

It is an object of the present invention to provide an image forming apparatus in which a moving member is stably supported when pulled out from the apparatus main body.

To achieve the above object, an image forming apparatus according to the present invention includes:

an apparatus main body having an opening;

a moving member to which a cartridge is removably attached, the moving member configured to hold the cartridge and be movable through the opening between a housed position at which the cartridge is housed inside the apparatus main body and an exposed position at which the cartridge is exposed to outside of the apparatus main body;

an opening/closing portion configured to be rotatable between an open position that opens the opening and a closed position that closes the opening, the opening/closing portion including a first support portion and a second support portion that support the moving member located at the exposed position; and a metal member attached to the opening/closing portion, the metal member configured to face the moving member in a state in which the moving member is located at the exposed position and supported by the first support portion and the second support portion, wherein the metal member is placed between the first support portion and the second support portion in a rotation axis direction of the opening/closing portion.

According to the present invention, it is possible to provide an image forming apparatus in which a moving member is stably supported when pulled out from the apparatus main body.

Further features of the present invention will become apparent from the following description of exemplary embodiments with reference to the attached drawings.

DESCRIPTION OF THE EMBODIMENTS

Hereinafter, a description will be given, with reference to the drawings, of various exemplary embodiments (examples), features, and aspects of the present disclosure. However, the sizes, materials, shapes, their relative arrangements, or the like of constituents described in the embodiments may be appropriately changed according to the configurations, various conditions, or the like of apparatuses to which the disclosure is applied. Therefore, the sizes, materials, shapes, their relative arrangements, or the like of the constituents described in the embodiments do not intend to limit the scope of the disclosure to the following embodiments.

First Embodiment

Image Forming Apparatus

An image forming apparatus including a cartridge according to the present invention is first described. Image forming apparatuses generally refer to apparatuses that form images on recording media using various known image forming principles and methods such as an electrophotographic process, an electrostatic recording process, and a magnetic recording process. For example, image forming apparatuses include copiers, printers (such as laser printers and LED printers), facsimile machines, word processors, image display apparatuses (electronic blackboards and electronic whiteboards), and the like. Recording media are objects on which images are to be formed by an image forming apparatus and include paper, OHT (Overhead Transparency) sheet, image display media, and the like.

A cartridge is an object that can be attached to and detached from the apparatus main body of an image forming apparatus. The cartridge is removably attached to the apparatus main body of an image forming apparatus and contributes to an image forming process for forming an image on a recording medium. The apparatus main body is a component of a cartridge-type image forming apparatus excluding the cartridge.

Examples of an image bearing member include an electrophotographic photosensitive member in the electrophotographic process, an electrostatic recording dielectric in the electrostatic recording process, a magnetic-recording magnetic body in the magnetic recording process, and other members capable of forming images according to various image forming principles and methods. An image forming process means is a device that acts on the image bearing member to form an image.

Figure 1:
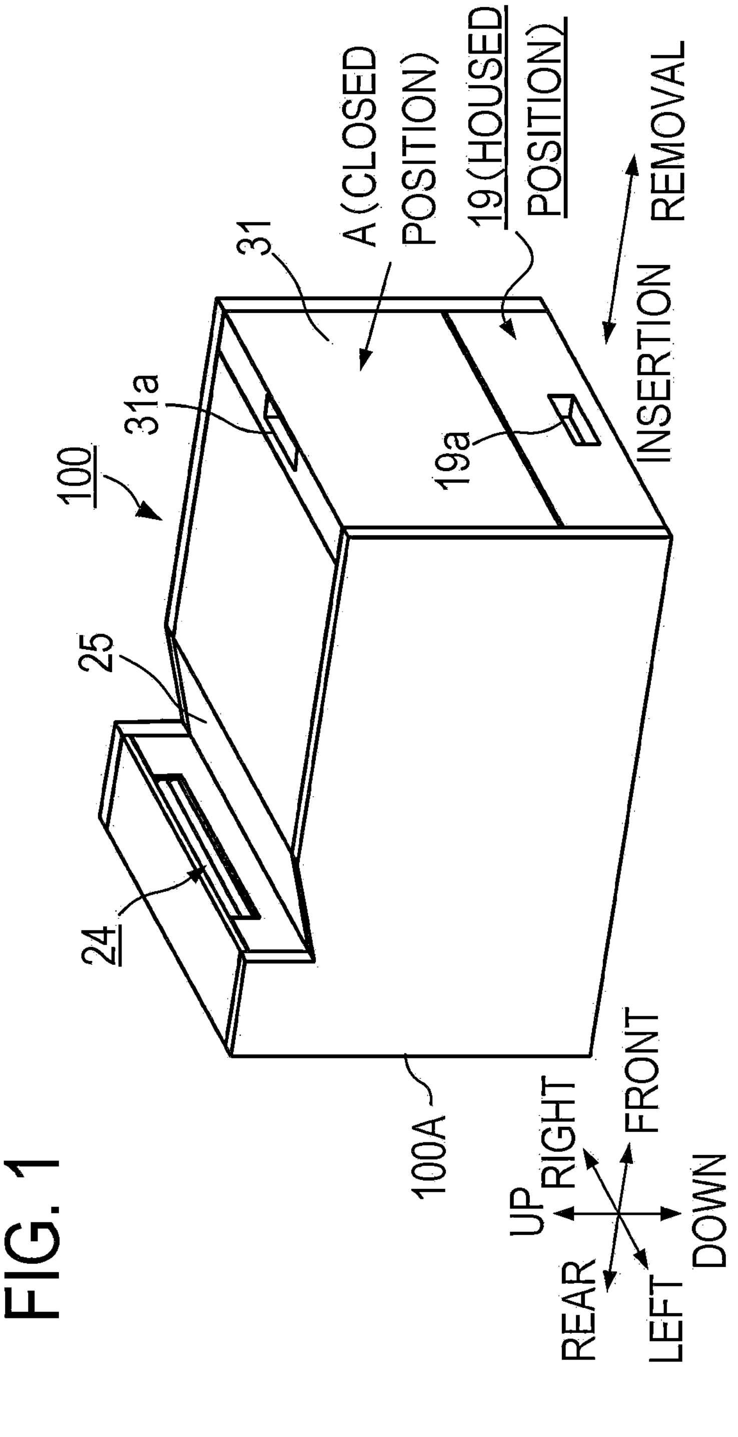
FIG. 1 is a perspective view of the appearance of an image forming apparatus according to a first embodiment.
Figure 2:
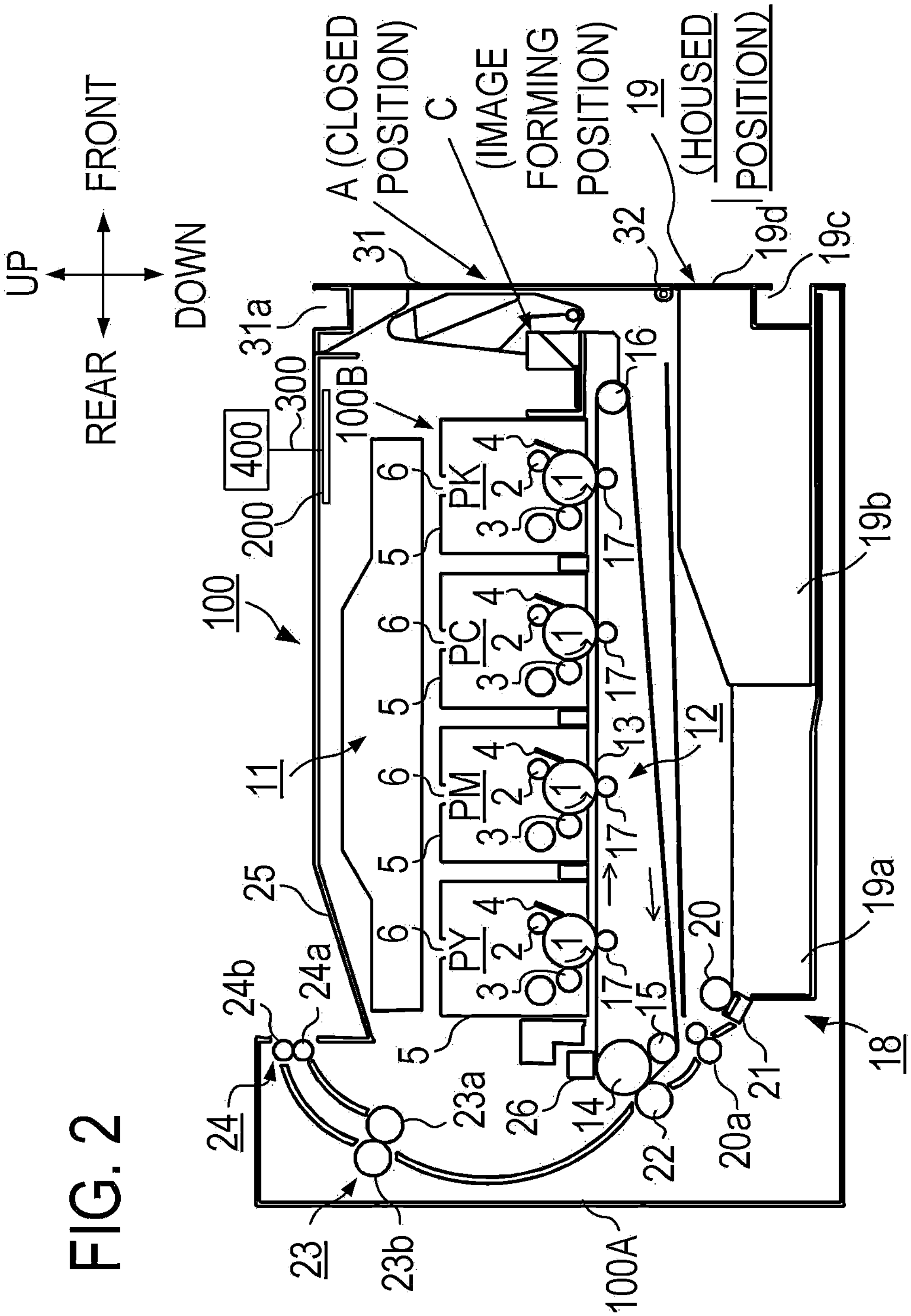
FIG. 2 is a cross-sectional view of the image forming apparatus according to the first embodiment.

An image forming apparatus 100 according to the first embodiment of the present invention is now specifically described. FIG. 1 is a perspective view of the appearance of the image forming apparatus 100. FIG. 2 is a schematic cross-sectional view of the image forming apparatus 100 as viewed from the left side. The image forming apparatus 100 is a four-color full-color laser printer (electrophotographic image forming apparatus) using an electrophotographic process, and includes first to fourth cartridges P (PY, PM, PC, PK) as multiple cartridges.

The image forming apparatus 100 is a color printer capable of forming a four-color full-color image or a monocolor image on a sheet-shaped recording medium (sheet material: hereinafter referred to as a recording material) S. The image forming apparatus 100 forms an image on the recording material S on the basis of an electrical image signal that is output from an external host apparatus 400 and input to a control portion 200 via an interface portion 300. The external host apparatus 400 may be a personal computer, an image reader, or a counterpart facsimile apparatus, for example.

The control portion 200 is a control means for controlling the electrophotographic image forming process of the image forming apparatus 100, and transmits and receives various types of electrical information to and from the external host apparatus 400. It also controls the processing of electrical information input from various process devices and sensors, the processing of command signals to various process devices, predetermined initial sequence processing, predetermined sequences of electrophotographic image forming process, and the like.

In the following description, the front side (front surface side) of the image forming apparatus 100 is the side on which an apparatus opening/closing door (main body door) 31 is disposed. The rear side (back surface side) is the side opposite to the front side (front surface side). The front-rear direction refers to the direction from the rear side to the front side of the image forming apparatus 100 (front direction) and the opposite direction (rear direction). The left and right refer to the left and right when the image forming apparatus 100 is viewed from the front. The left-right direction refers to the direction from right to left (left direction) and the opposite direction (right direction). Up and down refer to up and down in the direction of gravity (vertical direction). The upward direction is the direction from bottom to top, and the downward direction is the direction from top to bottom. The longitudinal direction is a direction parallel to the rotation axis direction of an electrophotographic photosensitive member, which is an image bearing member on which a latent image is formed. The longitudinal direction is parallel to the left-right direction. The transverse direction is a direction perpendicular to the longitudinal direction (orthogonal direction).

A cartridge housing portion 100B is provided within an apparatus main body (main body frame) 100A of the image forming apparatus 100. In the cartridge housing portion 100B, four cartridges, namely, first to fourth cartridges PY, PM, PC, and PK, are horizontally arranged from the rear side to the front side of the apparatus main body 100A and are attached at predetermined attachment positions in a predetermined manner. This configuration may be referred to as an in-line configuration, and an image forming apparatus configured in this manner may be referred to as a tandem type. The attachment position of a cartridge P refers to a position in the cartridge housing portion 100B where the cartridge P can perform an image forming operation.

The cartridge P contributes to an image forming process for forming an image on a recording material S, and is removably attached to the apparatus main body 100A of the image forming apparatus 100 to be used. Each cartridge P of the first embodiment has a photosensitive drum (hereinafter, referred to as a drum) 1, which is a drum-shaped electrophotographic photosensitive member serving as an image bearing member on which a latent image is formed. The cartridge P is what is known as an integrated process cartridge including a charging means 2, a developing means 3, and a cleaning means 4 as electrophotographic image forming process means for acting on the drum 1. In the first embodiment, the axial direction (rotation axis direction) of the rotatable drum 1 is substantially parallel to the left-right direction.

In the first embodiment, the charging means 2 is a contact charging roller. The developing means 3 is a contact or non-contact developing device including a developing roller, which serves as a developer carrying member that supplies developer to the drum 1 and develops a latent image into a developer image, and a developer storing portion, which stores the developer. The cleaning means 4 is a blade cleaning device including a cleaning blade as a cleaning member and a waste toner storing portion.

The cartridges P, each having a similar electrophotographic process mechanism including the image forming process device as described above, contain developers (hereinafter, referred to as toner) of different colors. That is, the first cartridge PY contains yellow (Y) toner in the developing means 3 and forms a Y toner image on the surface of the drum 1. The second cartridge PM contains magenta (M) toner in the developing means 3 and forms an M toner image on the surface of the drum 1. The third cartridge PC contains cyan (C) toner in the developing means 3 and forms a C toner image on the surface of the drum 1. The fourth cartridge PK contains black (K) toner in the developing means 3 and forms a K toner image on the surface of the drum 1.

A laser scanner unit 11 is disposed above the cartridges PY, PM, PC, and PK and serves as an exposure apparatus unit (exposure means) for exposing the drum 1 of each cartridge P to form a latent image. The laser scanner unit 11 outputs laser light modulated in accordance with image information of each color, which is input from the external host apparatus 400 to the control portion 200, and scans and exposes the surface of the drum 1 of each cartridge P through an exposure window 6 provided in the upper surface of the cartridge frame 5.

An intermediate transfer unit 12 is disposed below the cartridges PY, PM, PC, and PK and serves as a transfer unit (transfer member), which faces the drum 1 of each cartridge P to primarily transfer a toner image and then secondarily transfers the toner image onto a recording material S.

The intermediate transfer unit 12 includes a flexible endless belt (belt member, belt) 13, which is an intermediate transfer member (a second image bearing member: intermediate recording medium) made of a dielectric material. The intermediate transfer unit 12 further includes a drive roller 14, a turn roller 15, and a tension roller 16, which suspend and tension the belt 13 to move it in a circular motion. The drive roller 14 and the turn roller 15 are disposed at the rear side within the apparatus main body 100A. The tension roller 16 is disposed at the front side within the apparatus main body 100A.

When each cartridge P is attached at a predetermined attachment position in a predetermined manner, the lower surface of its drum 1 is in contact with the upper surface of the upper belt portion of the belt 13. Four primary transfer rollers 17 are disposed on the inner side of the belt 13, opposed to the drums 1 of the respective cartridges P with the upper belt portion in between.

In each cartridge P, the nip portion between the drum 1 and the belt 13 is a primary transfer nip portion. A secondary transfer roller 22 is in contact with the drive roller 14 through the belt 13. The nip portion between the secondary transfer roller 22 and the belt 13 is the secondary transfer nip portion.

A paper feed unit 18 is disposed below the intermediate transfer unit 12 to store recording materials S, onto which a toner image is to be transferred, and to convey the recording materials S to the intermediate transfer unit 12 one sheet at a time.

The paper feed unit 18 includes a paper feed cassette (storage member) 19, a paper feed roller 20, a separation pad 21, a pair of registration rollers 20*a*, and the like. The paper feed cassette 19 is a storage member for storing paper. The paper feed cassette 19 can be moved into and out of (inserted into and removed from) the front side of the apparatus main body 100A, and such a configuration may be referred to as front loading. In the first embodiment, the insert direction of the paper feed cassette 19 is the backward direction, and the removal direction is the forward direction.

A fixing apparatus 23 and a pair of discharge rollers 24, which serve as a fixing unit (fixing means), are disposed in the upper rear section in the apparatus main body 100A. The fixing unit applies heat and pressure to the recording material S, to which the toner image has been transferred, to fix the image and discharge the recording material S. The upper surface of the apparatus main body 100A is formed as a paper discharge tray 25. The fixing apparatus 23 includes a fixing film assembly 23*a* and a pressure roller 23*b*. The pair of discharge rollers 24 includes a discharge roller 24*a* and a discharge roller 24*b*.

Cartridge Replacement Method

A method for replacing a cartridge P according to the first embodiment is now described. As each of the first to fourth cartridges PY, PM, PC, and PK is used for image formation, the developer contained in the developing means 3 is consumed.

Thus, it is preferable to provide a means (not shown) for detecting the remaining amount of developer in each cartridge and have the control portion 200 compare the detected remaining amount value with a preset threshold value for cartridge life prediction or life warning. Then, for any cartridge whose detected remaining amount value is less than the threshold value, life prediction or life warning for that cartridge is displayed on a display portion (not shown). This can prompt the user to prepare a replacement cartridge or to replace the cartridge.

Tray, Opening, and Main Body Door

A tray 35, to which the cartridges P are removably attached, an opening 30, and a main body door 31 are now described in detail as a configuration relating to the replacement of the cartridges P. In the image forming apparatus 100 of the first embodiment, to improve usability, replacement of a cartridge P involves a method of placing the cartridge P in the tray (moving member) 35, which is to be pulled out, and replacing through front access (pulling-out method).

The front surface side of the apparatus main body 100A has the opening 30, which allows the cartridge P to pass through to be removed. The opening 30 also functions as an opening through which the cartridge P is inserted into the cartridge housing portion 100B within the apparatus main body 100A.

Figure 3:
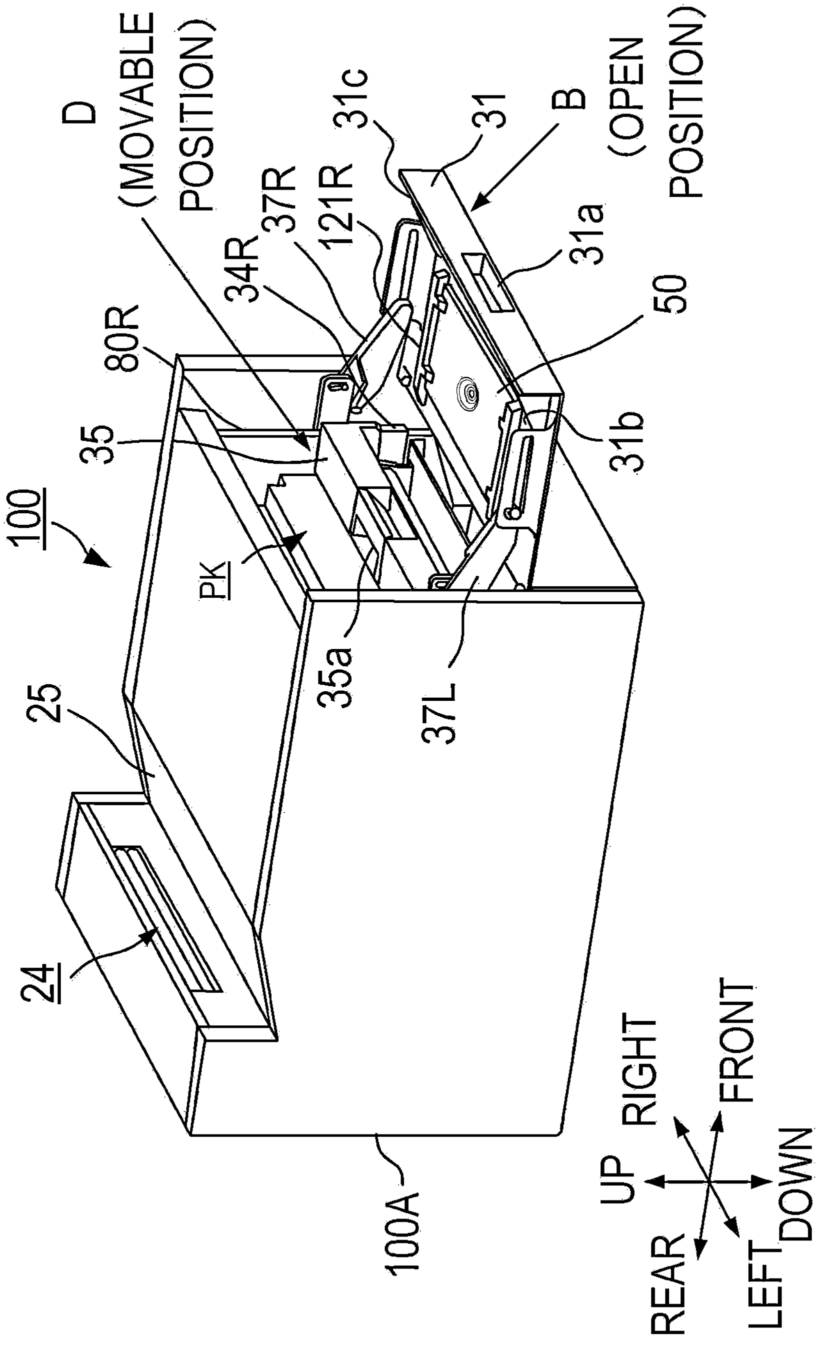
FIG. 3 is a perspective view of the appearance of the image forming apparatus according to the first embodiment with the main body door open.
Figure 4:
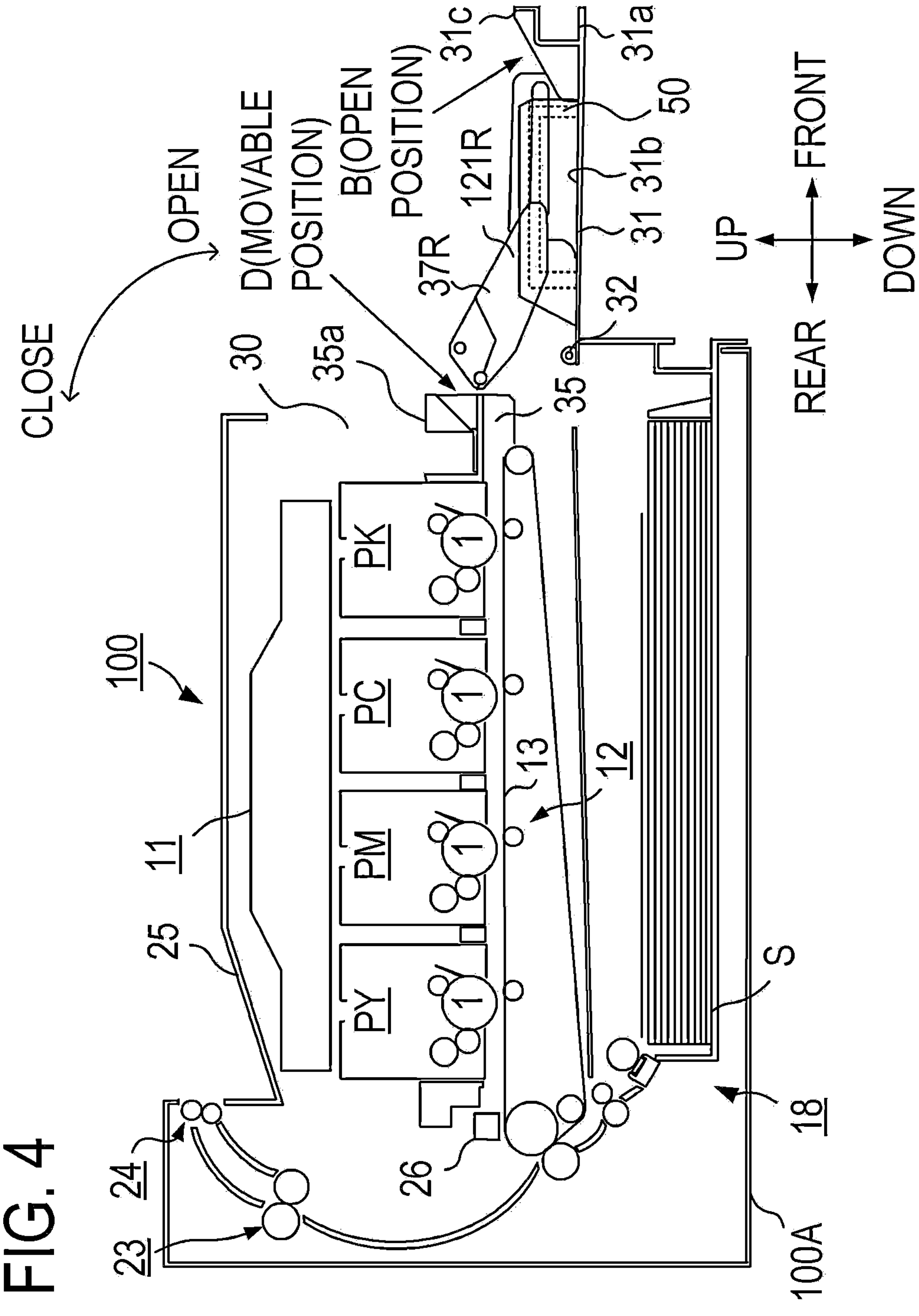
FIG. 4 is a cross-sectional view of the image forming apparatus according to the first embodiment with the main body door open.

FIG. 3 is a perspective view of the appearance of the image forming apparatus 100 with the main body door 31 open. FIG. 4 is a schematic cross-sectional view of the image forming apparatus 100 with the main body door 31 open. The image forming apparatus 100 includes the main body door (opening/closing member) 31, which is movable between a closed position (closing position) A, which closes the opening 30 as shown in FIGS. 1 and 2, and an open position B, which opens the opening 30 as shown in FIGS. 3 and 4. That is, the main body door 31 is rotatably supported by the apparatus main body 100A, and can assume the closed position A, which closes the opening 30, and the open position B, which opens the opening 30. In the first embodiment, the main body door 31 can be opened and closed by rotating about a hinge shaft (lateral shaft) 32 on the lower side of the door relative to the apparatus main body 100A. The hinge shaft 32 extends in the left-right direction, and the rotation axis direction of the main body door 31 is the left-right direction.

That is, the main body door 31 can be rotated about the hinge shaft 32 in a get up direction to be closed relative to the apparatus main body 100A as shown in FIGS. 1 and 2, and by closing the main body door 31, the opening 30 is closed. Also, the main body door 31 can be rotated about the hinge shaft 32 toward the front side of the apparatus main body 100A so as to be laid substantially horizontally and opened relative to the apparatus main body 100A as shown in FIGS. 3 and 4. As a result, the opening 30 in the front surface of the apparatus main body is opened widely. To improve ease of opening and closing the main body door 31, the main body door 31 includes a door handle 31*a*. The door handle 31*a* is provided so as to be located at the upper end of the main body door 31 when the main body door 31 is in the closed position A.

At the left and right ends of the inner surface 31*b* of the main body door 31, a tray support portion 121L (first support portion) and a tray support portion 121R (second support portion) are provided as support portions for supporting the tray 35. The main body door 31 and the tray support portions 121L and 121R are made of resin. The inner surface 31*b* is a surface that faces the inside of the apparatus main body 100A when the main body door 31 is in the closed position A, and is an upper surface that faces upward outside the apparatus main body 100A when the main body door 31 is in the open position B. The tray support portions 121L and 121R function as support portions that support the tray 35 when the tray 35 is pulled out to a cartridge attachment/detachment position, which will be described below. The tray support portion 121L is located on the left side of the main body door 31, and the tray support portion 121R is located on the right side of the main body door 31. The tray support portions 121L and 121R are spaced apart in the left-right direction.

Metal Member

Figure 5:
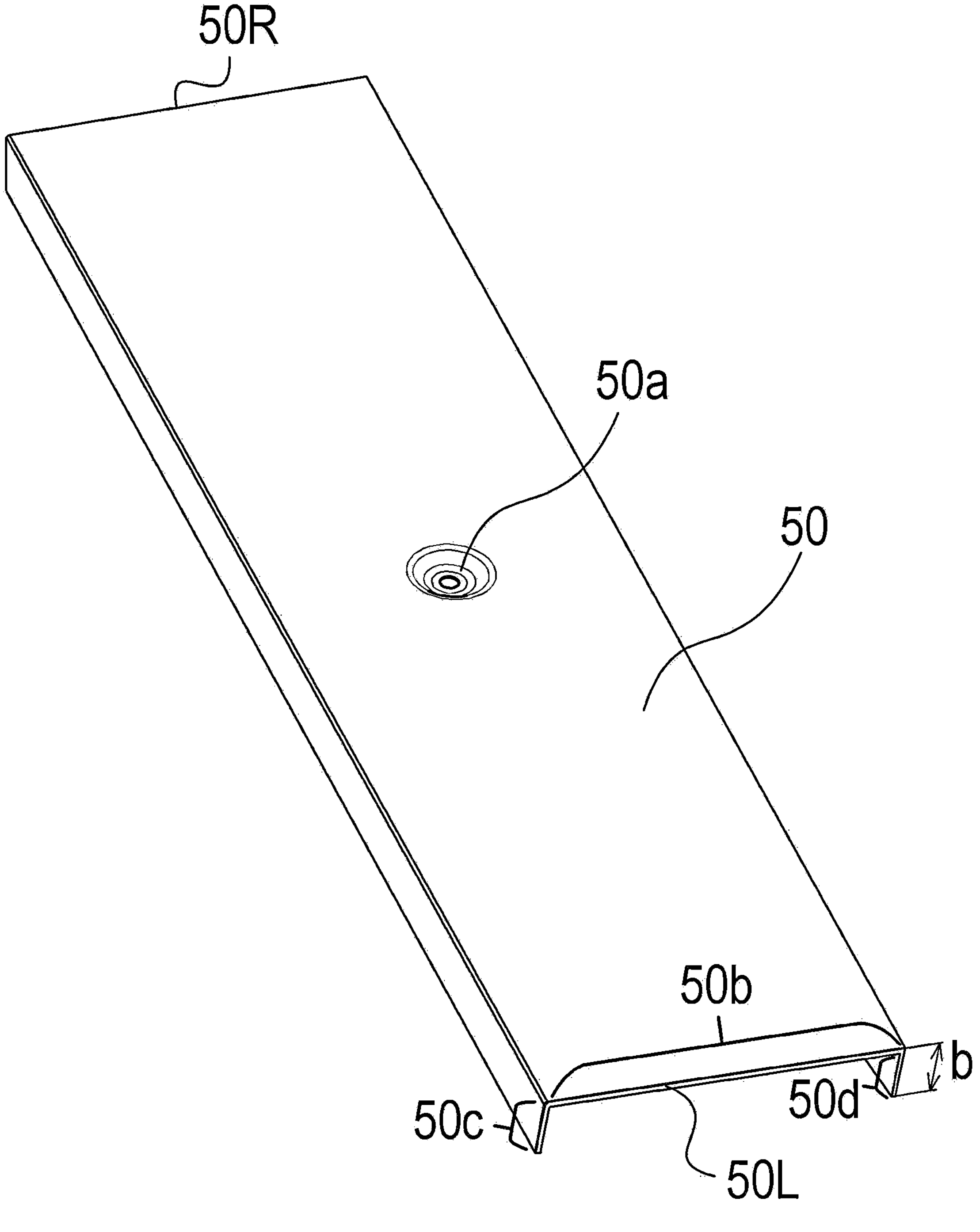
FIG. 5 is a perspective view of a metal member according to the first embodiment.

A metal member 50 attached to the main body door 31 is now described. FIG. 5 is a perspective view of the metal member 50 alone. Attaching the metal member 50 to the main body door 31 reinforces the main body door 31. The metal member 50 is formed from a metal plate and includes at least one bent portion. More specifically, as shown in FIG. 5, the metal member 50 is a plate-shaped member having a U-shaped (C-shaped) cross section. The metal member 50 includes a first extension portion 50*b* extending along the inner surface 31*b*, a second extension portion 50*c* extending from one end of the first extension portion 50*b* toward the inner surface 31*b*, and a third extension portion 50*d* extending from the other end of the first extension portion 50*b* toward the inner surface 31*b*. The extension direction of the first extension portion 50*b* is a direction along the inner surface 31*b*, and the extension direction of the second extension portion 50*c* and the third extension portion 50*d* is a direction intersecting (preferably perpendicular to) the inner surface 31*b*.

The metal member 50 is attached to the inner surface 31*b* of the main body door 31. When the main body door 31 is in the open position B, the metal member 50 is exposed to the outside of the apparatus main body 100A together with the inner surface 31*b*. When the main body door 31 is in the open position B, the extension direction of the first extension portion 50*b* is a direction along the horizontal direction (preferably in the front-rear direction). Furthermore, when the main body door 31 is in the open position B, the extension direction of the second extension portion 50*c* and the third extension portion 50*d* intersects with the horizontal direction (preferably the up-down direction). When the main body door 31 is in the open position B, the extension direction of the first extension portion 50*b* is a direction along the moving direction of the tray 35 (more preferably, a direction parallel to the moving direction of the tray 35). The metal member 50 is attached to the main body door 31 so that both ends of the cross-sectional shape face the main body door 31, that is, so that the opening side of the U-shaped cross section faces the main body door 31. This arrangement can prevent the user from touching the edge of the metal member 50 when the metal member 50 is placed on the main body door 31.

The metal member 50 is fixed to the main body door 31 by a screw. The metal member 50 has a recess 50*a* for the screw. The screw fixes the metal member 50 to the inner surface 31*b* of the main body door 31, and the metal member 50 covers a part of the inner surface 31*b* of the main body door 31.

Figure 6:
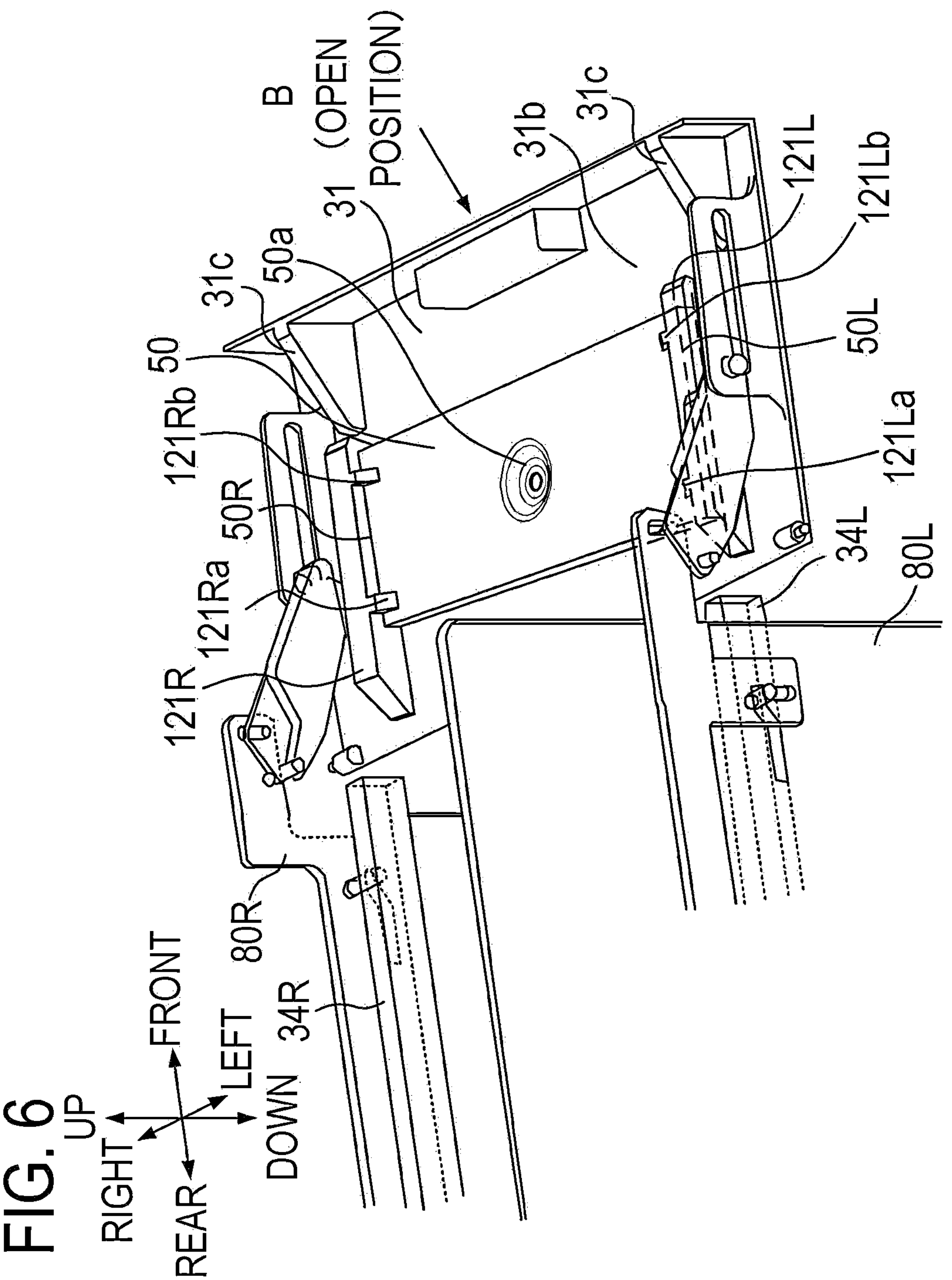
FIG. 6 is a perspective view of the main body door on which the metal member according to the first embodiment is set.

FIG. 6 is a perspective view of the main body door 31 on which the metal member 50 is set. FIG. 6 shows the main body door 31 in the open position B with the metal member 50 exposed. The metal member 50 is placed between the tray support portions 121L and 121R in the left-right direction. As shown in FIGS. 5 and 6, in the left-right direction, the metal member 50 has one end (left end) 50L and the other end (right end) 50R opposite to the one end 50L. In the left-right direction, the one end 50L is closer to the tray support portion 121L than the center point between the tray support portions 121L and 121R, and the other end 50R is closer to the tray support portion 121R than the center point between the tray support portions 121L and 121R. In this embodiment, the length of the metal member 50 in the left-right direction is 80% or more of the distance between the tray support portions 121L and 121R.

The tray support portion 121L has projections 121La and 121Lb projecting toward the right side, and the tray support portion 121R has projections 121Ra and 121Rb projecting toward the left side. In other words, the projections 121La and 121Lb of the tray support portion 121L extend toward the tray support portion 121R, and the projections 121Ra and 121Rb of the tray support portion 121R extend toward the tray support portion 121L. The projections 121La, 121Lb, 121Ra, and 121Rb are spaced apart from the inner surface 31*b* of the main body door 31. Also, the projections 121La and 121Lb are spaced apart in the front-rear direction, and the projections 121Ra and 121Rb are similarly spaced apart in the front-rear direction.

As viewed in a direction perpendicular to the inner surface 31*b* of the main body door 31, the metal member 50 is placed at a position overlapping the projections 121La, 121Lb, 121Ra, and 121Rb. The first extension portion 50*b* of the metal member 50 is sandwiched between the projections 121La, 121Lb, 121Ra, and 121Rb and the inner surface 31*b*. It is preferable that the projections 121La, 121Lb, 121Ra, and 121Rb come into contact with the metal member 50 when the main body door 31 is in the open position B and stress is applied from above to the tray support portions 121L and 121R. This further reduces twisting or bending of the main body door 31 when the tray support portions 121L and 121R support the tray 35.

The projections 121La and 121Ra are spaced apart in the left-right direction (a direction parallel to the rotation axis direction of the main body door 31). As such, when the main body door 31 or the tray support portions 121L and 121R are about to bend in the left-right direction, the projections 121La and 121Ra preferably come into contact with the metal member 50. This further limits deformation of the main body door 31 and the tray support portions 121L and 121R. The same applies to the projections 121Lb and 121Rb.

To provide the metal member 50 with satisfactory strength, it is preferable to increase the bending width b of the metal member 50. The bending width b refers to the length of each of the bent end (second extension portion 50*c*) and the bent end (third extension portion 50*d*) of the metal member 50. The bending width b of the metal member 50 in the first embodiment is 20 mm. Also, increasing the thickness of the metal plate is also effective in increasing the rigidity.

The metal member 50 and the tray support portions 121L and 121R do not necessarily need to be in contact. The metal member 50 and the tray support portions 121L and 121R may be placed adjacent to each other such that the tray support portions 121L and 121R come into contact with the metal member 50 when stress is applied to the tray support portions 121L and 121R. Whether the metal member 50 is positioned such that the first extension portion 50*b* is in contact with the projection portions of the tray support portions 121L and 121R, or the metal member 50 is positioned such that the first extension portion 50*b* is not in contact with but is opposed to the projection portions of the tray support portions 121L and 121R can be selected appropriately taking into consideration the weight of the cartridge P, the rigidity of the main body door 31, and the like. Arranging the metal member 50 and the tray support portions 121L and 121R adjacent to each other allows the metal member 50 to bend when stress is applied to the tray support portions 121L and 121R. This reduces the amount of deformation of the tray support portions 121L and 121R and the main body door 31. That is, the metal member 50 visibly improves the rigidity of the tray support portions 121L and 121R, and also improves the bending strength of the main body door 31. As a result, the main body door 31 stably supports the tray 35 that is pulled out to the outside of the apparatus main body 100A.

Furthermore, both left and right ends of the metal member 50 may be configured to be in contact with the tray support portions 121L and 121R, respectively. To increase the effect of limiting bending of the main body door 31 and the tray support portions 121L and 121R, the metal member 50 may be placed along the tray support portions 121L and 121R such that the side surfaces of the tray support portions 121L and 121R are in contact with the metal member 50.

Tray

Figure 7:
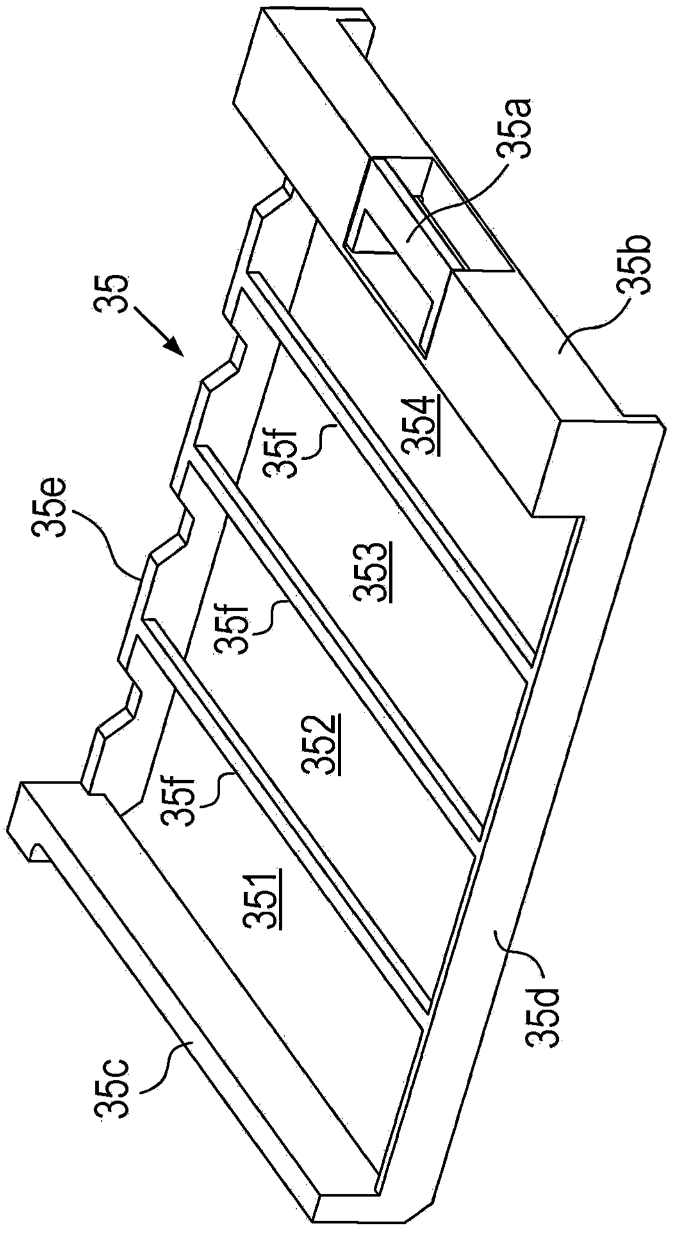
FIG. 7 is a perspective view of a tray according to the first embodiment.

The tray 35 is now described in more detail. FIG. 7 is a perspective view of the tray 35. When the main body door 31 is in the closed position A as shown in FIGS. 1 and 2, the tray 35 is in an image forming position C where each cartridge P is positioned at an attachment position that enables image forming operation. In the first embodiment, the image forming position C of the tray 35 is a position where the drum 1 of each cartridge P is in contact with the belt 13 of the intermediate transfer unit 12 as shown in FIG. 2.

As shown in FIG. 7, the tray 35 has a rectangular main frame and three partition plates 35*f*, which partition the inside of the main frame. The partition plates 35*f* are formed extending from the left frame 35*d* to the right frame 35*e*. The large frame portion of the tray 35 is divided into four approximately equal sections in the front-rear direction by the three partition plates 35*f*, and the tray 35 has first to fourth horizontally elongated small frame portions 351 to 354 formed in that order from the side corresponding to the rear frame 35*c* to the side corresponding to the front frame 35*b*. The horizontally elongated small frame portion 351 is a portion into which the first cartridge PY is inserted, the horizontally elongated small frame portion 352 is a portion into which the second cartridge PM is inserted, the horizontally elongated small frame portion 353 is a portion into which the third cartridge PC is inserted, and the horizontally elongated small frame portion 354 is a portion into which the fourth cartridge PK is inserted.

Each cartridge P is inserted from above into the corresponding small frame portion of the tray 35, and the lower surfaces of the left and right eaves portions of the cartridge P are received by the upper surfaces of the left and right frames 35*d* and 35*e* of the tray 35, so that the cartridge P is placed on and supported by the tray 35. That is, the tray 35 supports each cartridge P such that the cartridge P can be removed directly upward (above). Also, by moving each cartridge P directly downward (below), the cartridge P is supported by the tray 35, and the tray 35 roughly holds each cartridge P. This configuration facilitates replacement of the cartridges.

Figure 8:
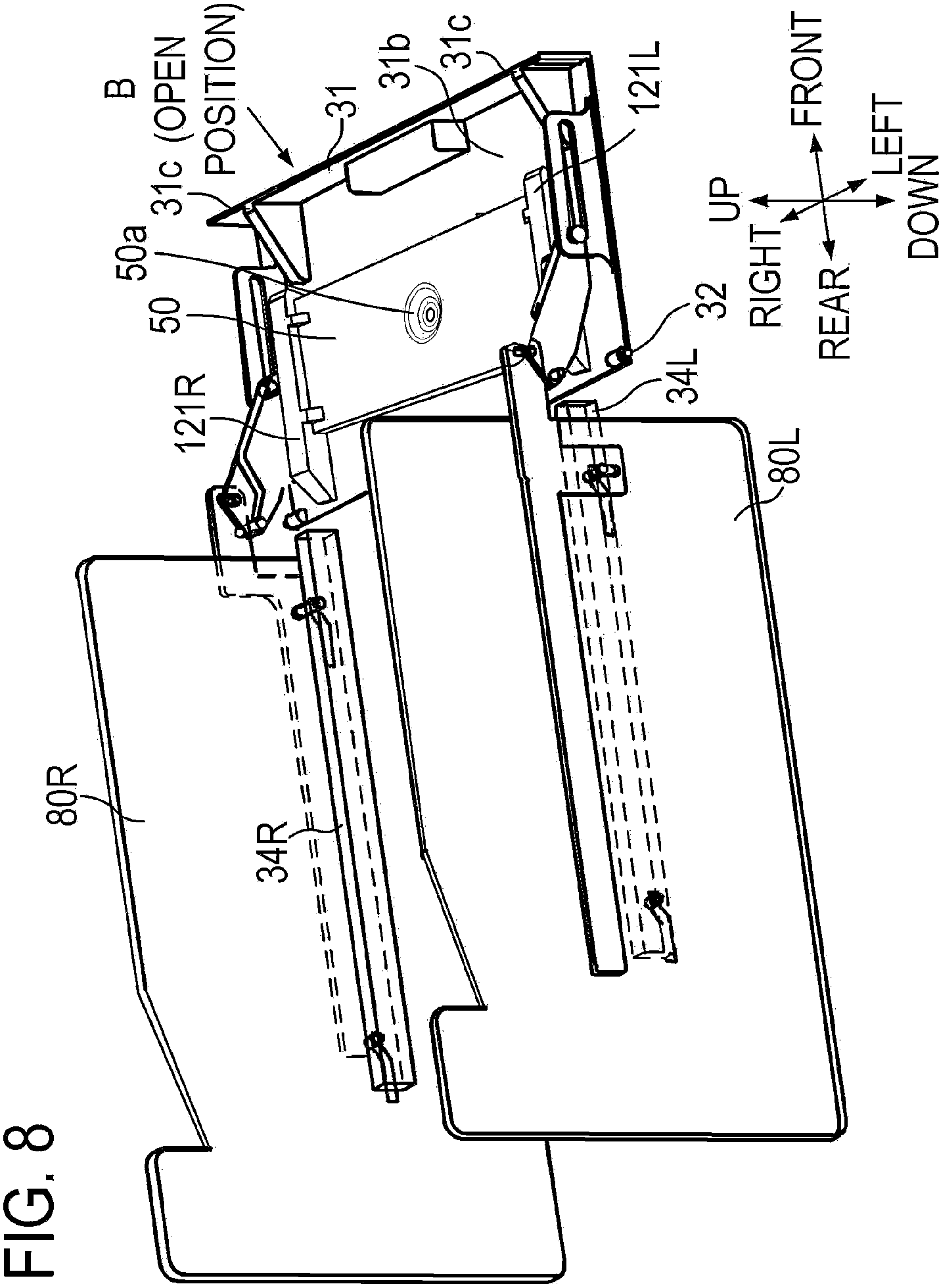
FIG. 8 is a perspective view of holding members of the tray according to the first embodiment.

FIG. 8 is a perspective view showing the inside of the main body and holding members (support members) provided on the main body door 31 to hold the tray 35. When the tray 35 holding the cartridges PY, PM, PC, and PK is positioned at the image forming position C, it is held on the tray holding members 34L and 34R on the inner side surfaces of the main body and can slide linearly and horizontally (parallel to the installation surface of the apparatus main body 100A) in the front-rear direction. That is, the lower surfaces of the left and right frames 35*d* and 35*e* of the tray 35 are placed on and supported by the upper surfaces of the left and right tray holding members 34L and 34R, respectively. The tray 35 is supported between left and right frames 80L and 80R so as to slide horizontally in the front-rear direction relative to the tray holding members 34L and 34R by sliding on the upper surfaces of the tray holding members 34L and 34R.

The left and right frames 80L and 80R shown in FIG. 8 are fixed and placed as left and right side plates of the main frame (main body frame), which forms the skeletal structure of the apparatus main body 100A. In contrast, the tray holding members 34L and 34R can be displaced in an obliquely upward or downward direction, as will be described below. The left and right frames 80L and 80R are formed from metal plates, and are electrically grounded via the ground of the main body power supply by a circuit (not shown) to prevent charging.

Tray Displacement Between Image Forming Position and Movable Position

The displacement operation of the tray 35 between the image forming position C and the movable position D is now described in more detail. The tray holding members 34L and 34R move a predetermined amount in an obliquely upward direction (forward and upward) in conjunction with the opening operation (opening rotation) of the main body door 31. As a result, the tray 35 supporting the cartridges PY, PM, PC, and PK is displaced (changed in position) from the image forming position C shown in FIG. 2 to the movable position D shown in FIG. 4.

This displacement (movement) of the tray 35 separates the drums 1 of the cartridges P supported on the tray 35 from the belt 13 as shown in FIG. 4. That is, the movable position D is a separation position where the drums 1 are separated from the belt 13 with the tray 35 located inside the apparatus main body 100A. The tray 35 moves between the image forming position C and the movable position D by ascending and descending inside the apparatus main body 100A.

At the same time that each drum 1 and the belt 13 are separated from each other, the interface members of each cartridge P (for example, the pressing member, the drive connecting member, the power supply member, and the like of the cartridge) are separated from the cartridge. The interlocking mechanism between the main body door 31 and the tray holding members 34L and 34R will be described in detail below. When the tray 35 is at the movable position D, the drums 1 are not in contact with the belt 13, so that the tray 35 can be moved to the outside of the image forming apparatus (the attachment/detachment position E).

Tray Displacement Between Movable Position and Attachment/Detachment Position

The displacement operation of the tray 35 between the movable position D and the attachment/detachment position E is now described in more detail. The tray 35 includes a tray handle (movement restriction release means) 35*a* on the tray front frame piece. As shown in FIGS. 3 and 4, when the main body door 31 is in the open position B, the user can grip the tray handle 35*a* exposed through the opened opening 30. By gripping the tray handle 35*a*, the tray-side claw (movement restriction means) of the tray 35 (not shown) is disengaged from the main body-side claw hook portion (main body-side engagement portion). This allows the tray 35 to be pulled out from the movable position D inside the apparatus main body 100A to the outside of the apparatus main body 100A, and to slide horizontally forward by sliding on the tray holding members 34L and 34R.

Figure 9:
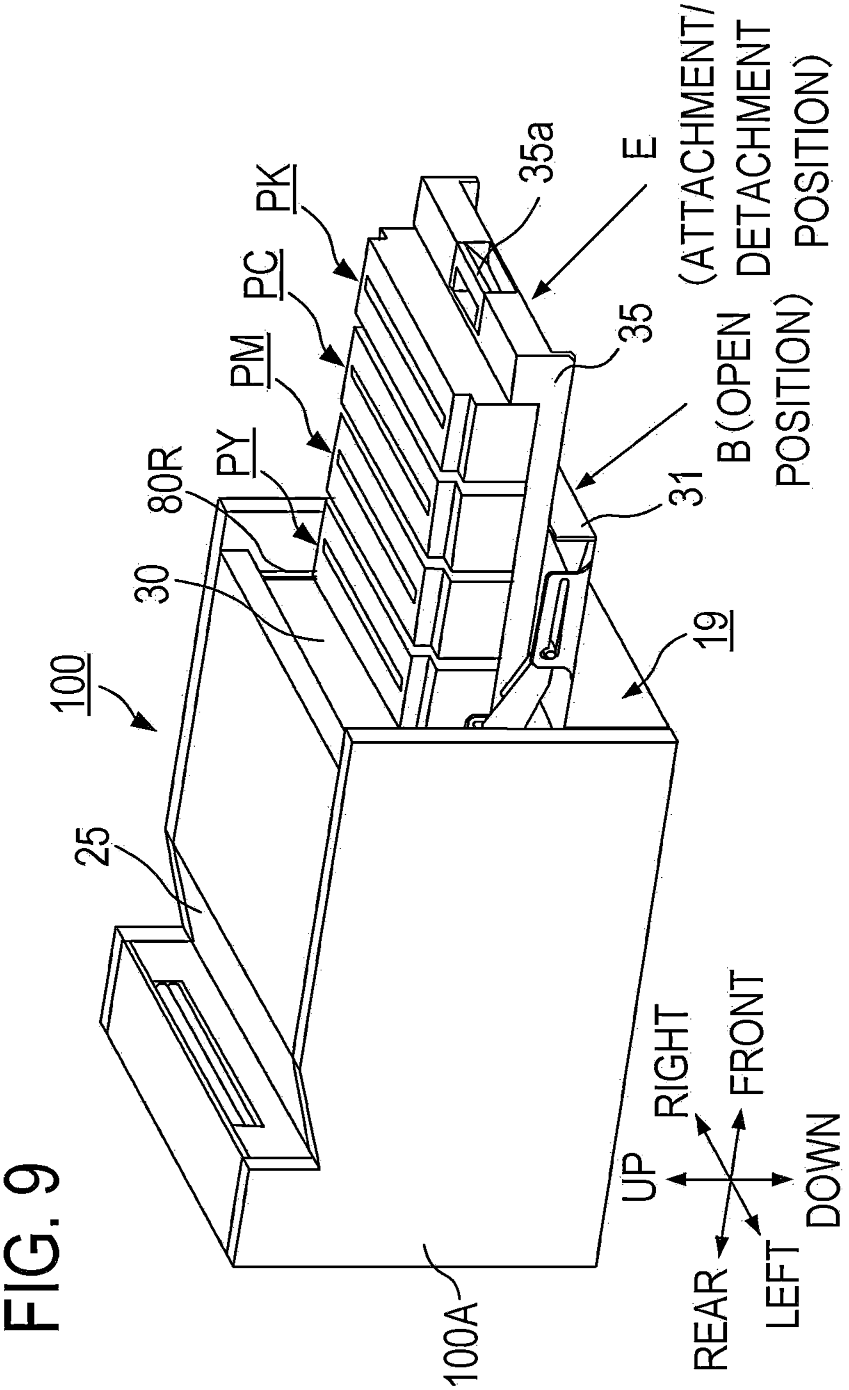
FIG. 9 is a perspective view of the appearance of the image forming apparatus according to the first embodiment with the tray pulled out.
Figure 10:
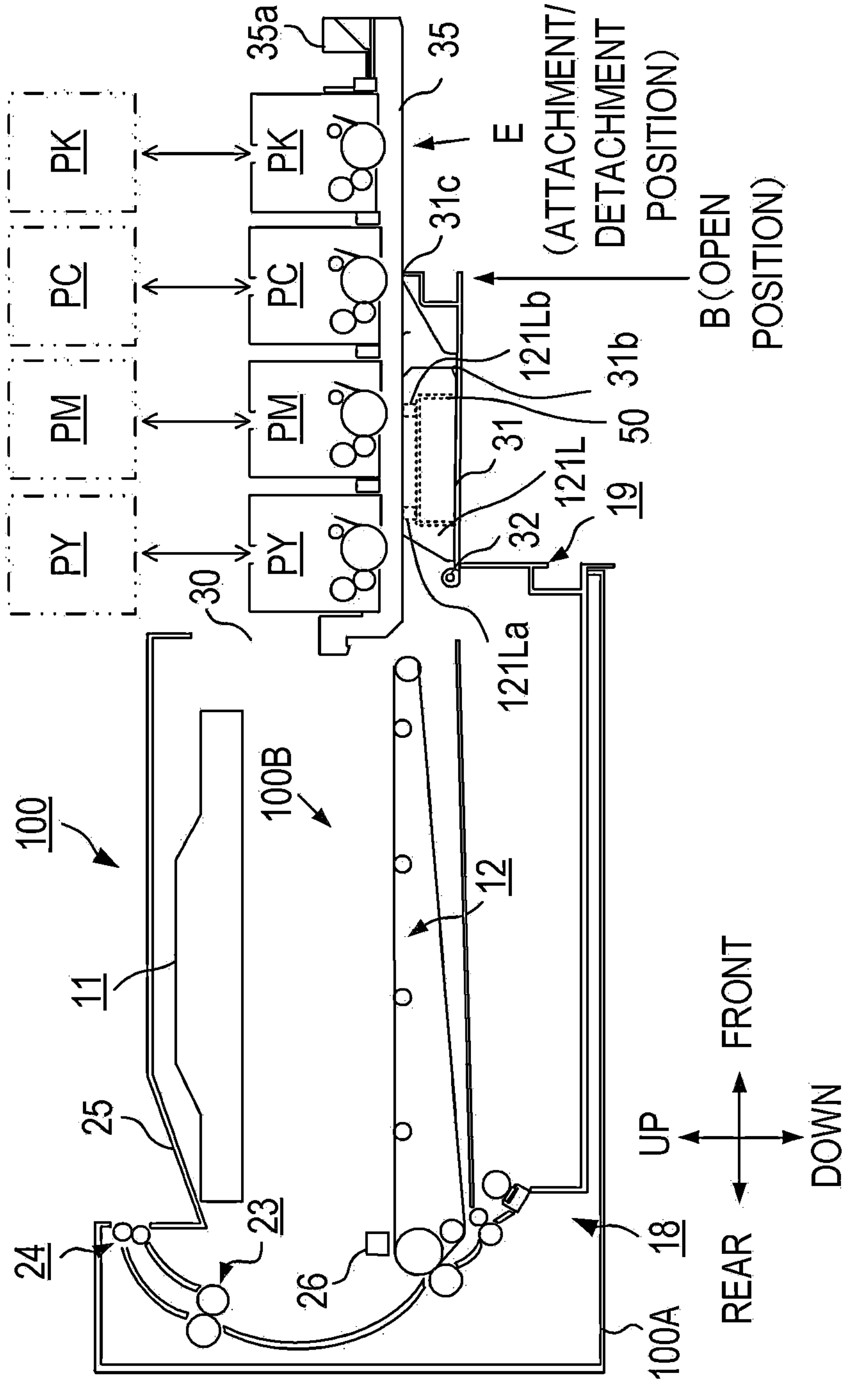
FIG. 10 is a cross-sectional view of the image forming apparatus according to the first embodiment with the tray pulled out.

FIG. 9 is a perspective view of the appearance of the image forming apparatus 100 with the tray 35 located at the attachment/detachment position E. FIG. 10 is a schematic cross-sectional view of the image forming apparatus 100 with the tray 35 located at the attachment/detachment position E. When the tray 35 is pulled out to the attachment/detachment position E, the cartridges P can be replaced.

As shown in FIG. 10, the tray 35 is configured to be movable through the opening 30 to a predetermined pull-out position outside the apparatus main body 100A, that is, to the attachment/detachment position E where the cartridges P can be attached to and detached from the tray 35 in a predetermined manner. When the tray 35 is located at the attachment/detachment position E, most of the tray 35 protrudes from the inside of the apparatus main body 100A to the outside. That is, the attachment/detachment position E is an exposed position where the tray 35 and the cartridges P held by the tray 35 are exposed to the outside of the apparatus main body 100A. In contrast, the image forming position C and the movable position D are housed positions where the tray 35 and the cartridges P held by the tray 35 are housed inside the apparatus main body 100A. When the tray 35 is at the attachment/detachment position E, the tray support portion 121L supports the bottom surface of the left frame 35*d* of the tray 35, which is positioned to protrude significantly from the apparatus main body 100A, and the tray support portion 121R supports the bottom surface of the right frame 35*e*. The tray 35 is movable between the exposed position and the housed position through the opening 30 in the apparatus main body 100A.

The tray support portions 121L and 121R are provided on the inner surface 31*b* of the main body door 31 and move integrally with the main body door 31. In the first embodiment, the tray support portions 121L and 121R are fixed to the main body door 31, but the tray support portions 121L and 121R may be formed integrally with the main body door 31. When the main body door 31 is in the open position B, the support surfaces of the tray support portions 121L and 121R are preferably parallel to the support surfaces of the tray holding members 34L and 34R, respectively, and are at the same height. That is, when the main body door 31 is in the open position B, the support surface of the tray support portion 121L and the support surface of the tray holding member 34L are located on the same plane, and the support surface of the tray support portion 121R and the support surface of the tray holding member 34R are located on the same plane. This configuration allows the tray 35 to move smoothly on the tray support portions 121L and 121R and the tray holding members 34L and 34R.

At the attachment/detachment position E, the first to fourth cartridges PY, PM, PC, and PK held on the tray 35 have passed through the opening 30 and are entirely exposed to the outside of the apparatus main body 100A, and the upper surfaces of all the cartridges P are exposed. When the tray 35 is pulled out a sufficient predetermined distance from the movable position D, a stopper portion (not shown) prevents the tray 35 from being pulled out any further. At this time, the tray 35 is supported by the tray support portions 121L and 121R on the inner surface 31*b* of the main body door 31 in a state in which the tray 35 is pulled out horizontally to the predetermined attachment/detachment position E. In this embodiment, when the tray 35 is located at the attachment/detachment position E, the tray 35 is held by the tray support portions 121L and 121R and a support portion 31*c* provided at the distal end of the main body door 31. When the tray 35 is located at the attachment/detachment position E (exposed position) and supported by the tray support portions 121L and 121R, the metal member 50 faces the tray 35. As shown in FIG. 10, when the tray 35 is located at the attachment/detachment position E, the drums 1 are exposed downward. In this state, the metal member 50 faces drums 1. Also, gaps are formed between the metal member 50 and the tray 35 and between the metal member 50 and the drums 1, so that the metal member 50 does not come into contact with the tray 35 or the drums 1. In the moving direction of the tray 35, the length of the tray 35 is longer than the diameter of the drum 1. In this state, the projections 121Ra, 121Rb, 121La, and 121Lb are located between the metal member 50 and the tray 35.

At the attachment/detachment position E, the tray 35 supports each cartridge P so that the cartridges can be removed directly upward (above). Also, the tray 35 supports each cartridge when the cartridge is moved directly downward (below). As such, to replace a cartridge, a used cartridge P to be replaced is lifted upward and removed from the tray 35 as shown by the broken lines in FIG. 10. Then, a new cartridge is fitted to and placed on the tray 35 from above, thereby replacing the cartridge. That is, in a state in which the tray 35 is pulled out to the outside of the apparatus main body 100A, the cartridges can be attached to and detached from the apparatus main body 100A.

The tray 35 is a moving member that is movable in a direction (perpendicular direction) perpendicular to (intersecting) the axial direction of the drum 1 of the cartridge P placed on the tray 35 (the longitudinal direction of the cartridge P). That is, the moving direction of the tray 35 between the movable position D and the attachment/detachment position E is a direction perpendicular to the longitudinal direction of the cartridge P and in the front-rear direction. In this embodiment, the moving direction of the tray 35 is parallel to the front-rear direction. The moving direction of the tray 35 between the movable position D and the attachment/detachment position E is a direction intersecting the rotation axis direction of the main body door 31, and in this embodiment, a direction perpendicular to the rotation axis direction of the main body door 31. The tray 35 is capable of receiving multiple cartridges P arranged in the moving direction between the movable position D and the attachment/detachment position E.

Cartridge Replacement Method

A method for replacing a cartridge is now described in more detail. To replace a cartridge, the tray 35 is pulled out to the attachment/detachment position E as shown in FIGS. 9 and 10, and one of the cartridges P held in the tray 35 that needs to be replaced is replaced. After a new cartridge is attached to the tray 35, the tray 35 is pushed in and moved to be housed within the apparatus main body, and is returned to the state before being pulled out as shown in FIGS. 3 and 4. At this time, by configuring the tray 35 to be urged from the rear side to the front side by a spring (pressure means) not shown, it is possible to reliably guide the user to push the tray 35 sufficiently back to a predetermined position.

When the tray 35 is sufficiently pushed back to the predetermined position, the tray-side claw (movement restriction means) (not shown) of the tray 35 engages with the main body-side claw hook portion (main body-side engagement portion). As a result, the tray 35 is pushed back from the attachment/detachment position E to the movable position D inside the apparatus main body, and is retained at that position.

In a state in which the tray 35 is in the movable position D, closing the opened main body door 31 as shown in FIGS. 1 and 2 brings the image forming apparatus 100 into a state that enables image formation. At this time, in conjunction with the closing rotation of the main body door 31 from the open position B to the closed position A, the tray holding members 34L and 34R are displaced (moved) a predetermined amount diagonally downward (rearward and downward), causing the tray 35 to be displaced (moved) from the movable position D to the image forming position C. As a result, the cartridges P supported by the tray 35 are located at the respective attachment positions in the cartridge housing portion 100B inside the apparatus main body. At the same time, the interface members of each cartridge P come into contact with the cartridge.

As described above, in the first embodiment, when the tray 35 is pulled out to the attachment/detachment position E, the main body door 31 supports the tray 35 through the tray support portions 121L and 121R. The metal member 50 is attached to the main body door 31 for reinforcement. Thus, the main body door 31 stably supports the tray 35 that is pulled out to the outside of the apparatus main body 100A.

Second Embodiment

A second embodiment of the present invention is now described. In the following description, the configurations of the second embodiment that are the same as that of the first embodiment will be given the same reference numerals and the description will be omitted, and the characteristic parts of the second embodiment will be mainly described. The second embodiment differs from the first embodiment in that the metal member 50 is electrically grounded.

In the second embodiment, the metal member 50 is electrically grounded. By electrically grounding the metal member 50, foreign matter adhering to the inner surface 31*b* of the main body door 31 is prevented from being electrostatically transferred to the drums 1 of the cartridges P, limiting image defects caused by foreign matter. To this end, in the second embodiment, the area of the metal member 50 facing drums 1 in the open position B is made larger than that in the first embodiment.

Figure 11:
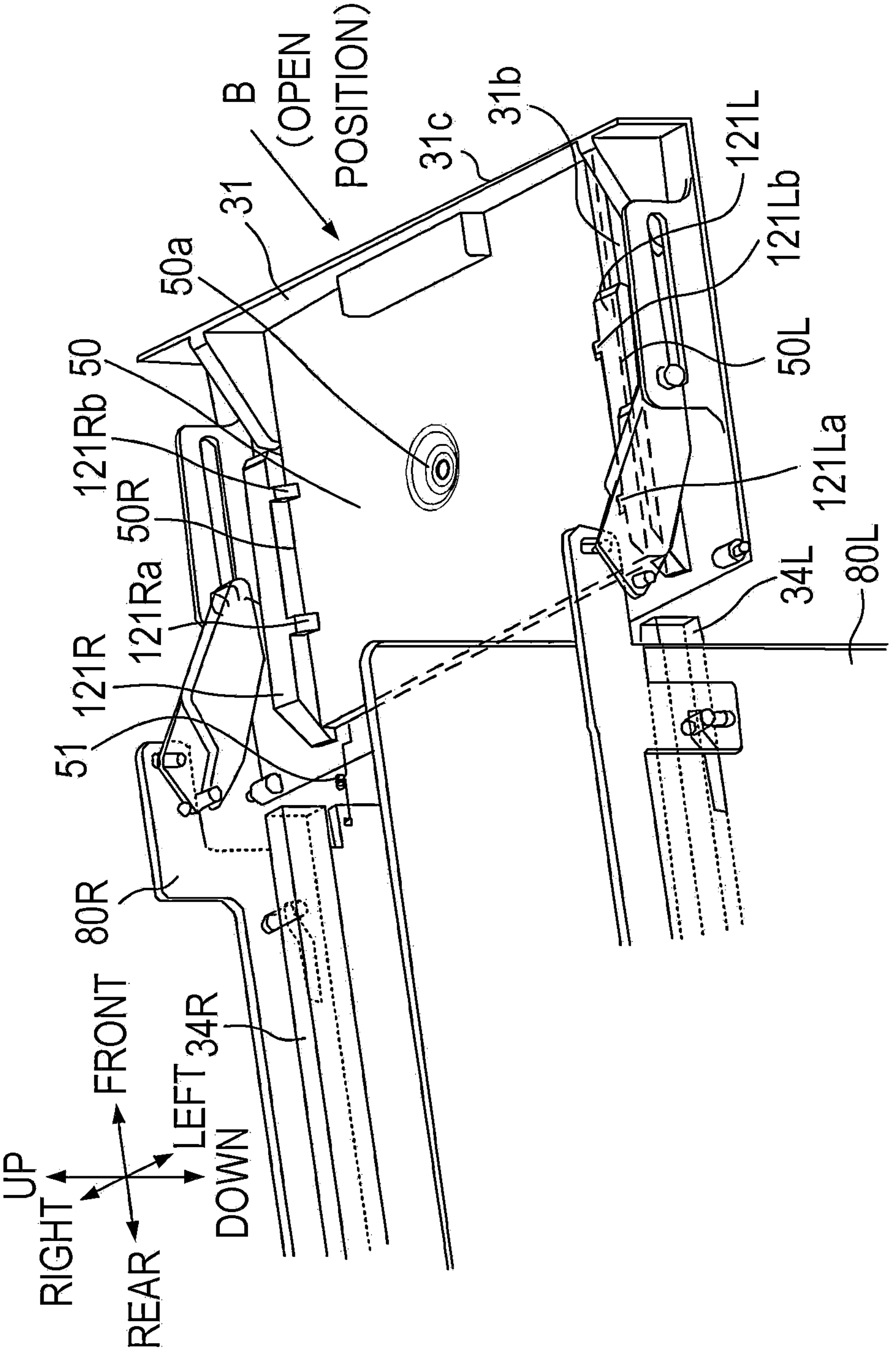
FIG. 11 is a perspective view of a main body door on which a metal member according to a second embodiment is set.
Figure 12:
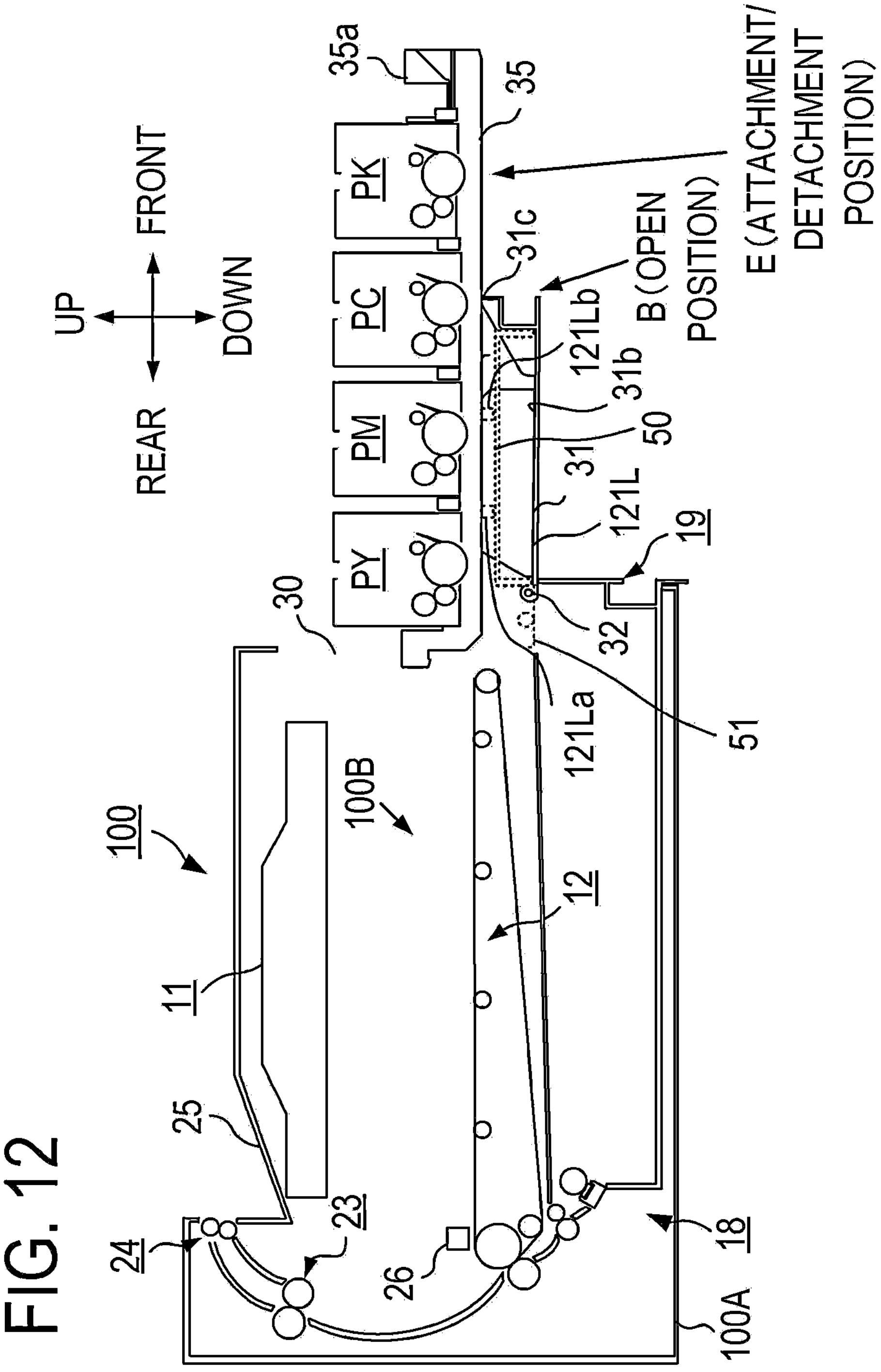
FIG. 12 is a cross-sectional view of an image forming apparatus according to the second embodiment with the tray pulled out.

FIG. 11 is a perspective view of the main body door 31 on which the metal member 50 according to the second embodiment is set. In the second embodiment, the metal member 50 is also provided on the inner surface 31*b* of the main body door 31. FIG. 12 is a schematic cross-sectional view of the image forming apparatus 100 according to the second embodiment, as viewed from the left side. In FIG. 12, the tray 35 is pulled out to the attachment/detachment position E where the cartridges P can be replaced.

When the tray 35 is pulled out to the attachment/detachment position E, drums 1 of the cartridges face the inner surface 31*b* of the main body door 31, that is, the metal member 50. When an image forming operation is performed inside the apparatus main body 100A, as described in the first embodiment, toner is electrostatically transferred, so that there are charged members within the apparatus main body 100A. Furthermore, when foreign matter such as dust enters the apparatus main body 100A, the dust may become charged due to the influence of the charged members.

For example, when the tray 35 is pulled out to the attachment/detachment position E to replace a cartridge in a state in which electrically charged dust adheres to the inner surface 31*b* of the main body door 31, the dust may be electrostatically attracted to the surface of the drums 1 depending on the charged state of the dust and the drums 1. When the tray 35 is housed in the apparatus main body 100A with foreign matter such as dust adhering to the drums 1 and an image forming operation is performed, the foreign matter may cause image defects.

In this respect, the metal member 50 of the second embodiment is electrically connected to the right frame 80R via a wire spring 51 and is grounded. As a result, the metal member 50 does not become charged, and even if foreign matter such as dust settles on the metal member 50, the metal member 50 eliminates the static electricity of the foreign matter, so that the foreign matter does not electrically fly toward the drums 1. In the second embodiment, the metal member 50 is configured to be electrically grounded via the wire spring 51 and the right frame 80R, but the method of grounding the metal member 50 is not limited to this, and any method may be used.

In the second embodiment, the metal member 50 has the function of receiving foreign matter that tends to adhere to the main body door 31, in addition to the function of reinforcing the tray support portions 121L and 121R. More specifically, when the tray 35 is at the attachment/detachment position E, the metal member 50 supports and reinforces the tray support portions 121L and 121R from below. When the tray 35 is at the image forming position C, the metal member 50 catches foreign matter that floats around the opening 30 of the apparatus main body 100A and tends to adhere to the inner surface 31*b* of the main body door 31. In order to receive substantially all of the foreign matter, the area of the metal member 50 that covers the opening 30, that is, the coverage of the opening 30 by the metal member 50, is preferably large. The coverage of the opening 30 by the metal member 50 is the proportion of the area of the metal member 50 to the area of the opening 30 when the image forming apparatus 100 is viewed in the front-rear direction with the main body door 31 in the closed position.

Since the adhesion of foreign matter to the metal member 50 is significantly affected by the air passage within the apparatus main body 100A, the coverage of the opening 30 may be set freely. Nevertheless, the metal member 50 preferably covers 30% or more of the opening 30. In the second embodiment, the area of the metal member 50 in the planar direction is configured to cover approximately 80% of the opening 30. By increasing the coverage of the metal member 50, the effect of reinforcing the main body door 31 by the metal member 50 can also be enhanced.

As described above, in the second embodiment, the metal member 50 is disposed between the tray support portion 121L and the tray support portion 121R. The metal member 50 thus receives the stress applied to the tray support portions 121L and 121R when the tray 35 is pulled out to the attachment/detachment position E. The tray support portions 121L and 121R are reinforced by this configuration. The configuration prevents the front side of the tray 35 from significantly bending downward due to the weight of the tray 35 and the cartridges P, causing damage to the surfaces of the drums 1. The configuration also prevents the weight balance of the apparatus main body 100A from being lost when the tray 35 is pulled out, causing the apparatus main body 100A to topple over to the front side. As such, the configuration of the second embodiment can easily support the weight of the tray and cartridges that are at a position protruding from the apparatus main body, without requiring a configuration that causes the apparatus main body to be large.

Furthermore, in the second embodiment, the metal member 50 is electrically grounded. Accordingly, even if foreign matter such as charged dust floating in the apparatus main body 100A tends to adhere to the inner surface 31*b* of the main body door 31, the foreign matter would generally adhere to the metal member 50, which covers at least a part of the opening 30 when the tray 35 is at the image forming position C. Also, since the foreign matter adhering to the metal member 50 is neutralized by the metal member 50, the foreign matter on the metal member 50 is not transferred to the drums 1 at the attachment/detachment position E, thereby limiting image defects caused by the foreign matter.

The functions, materials, shapes, relative arrangements, and the like of the components described in the above embodiments are not intended to limit the scope of the present invention thereto unless otherwise specified. For example, the shape and number of the projections of the tray support portions 121L and 121R do not have to be as shown in FIG. 6. Each of the tray support portions 121L and 121R may have three or more projections, or may have only one projection that is long in the front-rear direction. Furthermore, multiple metal members 50 may be provided, and multiple metal members 50 may be provided corresponding to the number of projections of each of the tray support portions 121L and 121R. For example, the main body door 31 may include a metal member arranged to straddle the projections 121La and 121Lb and a metal member arranged to straddle the projections 121Ra and 121Rb. Also, similarly to the first and second embodiments, one metal member 50 may serve to reinforce multiple tray support portions. In this case, the shape of the metal member 50 and the width in the tray pull-out direction (front-rear direction) may be set freely. Additionally, in this embodiment, the cartridge P includes the drum 1, but the tray 35 may include the drum 1. In this case, the cartridge P may include a developing roller 3*a*. That is, the drum 1 may be provided in the cartridge P or the tray 35.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-213485, filed on Dec. 19, 2023, which is hereby incorporated by reference herein in its entirety.

What is claimed is:

1. An image forming apparatus configured to form an image on a recording medium, the image forming apparatus comprising:
- an apparatus main body having an opening;
- a moving member to which a cartridge is removably attached, the moving member configured to hold the cartridge and be movable through the opening between a housed position at which the cartridge is housed inside the apparatus main body and an exposed position at which the cartridge is exposed to outside of the apparatus main body;
- an opening/closing portion configured to be rotatable between an open position that opens the opening and a closed position that closes the opening, the opening/closing portion including a first support portion and a second support portion that support the moving member located at the exposed position; and
- a metal member attached to the opening/closing portion, the metal member configured to face the moving member in a state in which the moving member is located at the exposed position and supported by the first support portion and the second support portion,
- wherein the metal member is placed between the first support portion and the second support portion in a rotation axis direction of the opening/closing portion.

2. The image forming apparatus according to claim 1,
- wherein, in the rotation axis direction, the metal member has one end and an other end opposite to the one end, and, in the rotation axis direction, the one end is closer to the first support portion than a center point between the first support portion and the second support portion, and the other end is closer to the second support portion than the center point between the first support portion and the second support portion.

3. The image forming apparatus according to claim 2,
- wherein the first support portion is provided at a first end portion of the opening/closing portion in the rotation axis direction, and
- wherein the second support portion is provided at a second end portion opposite to the first end portion of the opening/closing portion in the rotation axis direction.

4. The image forming apparatus according to claim 1,
- wherein the first support portion includes a plurality of first projection portions arranged spaced apart in a direction intersecting the rotation axis direction of the opening/closing portion, and the plurality of first projection portions are located between the metal member and the moving member in the state in which the moving member is located at the exposed position and supported by the first support portion and the second support portion, and
- wherein the second support portion includes a plurality of second projection portions arranged spaced apart in a direction intersecting the rotation axis direction of the opening/closing portion, and the plurality of second projection portions are located between the metal member and the moving member in the state in which the moving member is located at the exposed position and supported by the first support portion and the second support portion.

5. The image forming apparatus according to claim 1,
- wherein the opening/closing portion has an upper surface, the upper surface faces upward in a case where the opening/closing portion is in the open position, and
- wherein the metal member includes a first extension portion extending in an extension direction along the upper surface of the opening/closing portion, a second extension portion extending from one end of the first extension portion toward the upper surface, and a third extension portion extending from an other end of the first extension portion in the extension direction toward the upper surface.

6. The image forming apparatus according to claim 5,
- wherein in a case where the opening/closing portion is in the open position, the extension direction of the first extension portion of the metal member is parallel to a moving direction in which the moving member moves from the housed position to the exposed position.

7. The image forming apparatus according to claim 6,
- wherein the first extension portion is in contact with the first support portion and the second support portion.

8. The image forming apparatus according to claim 6,
- wherein the first extension portion is opposed to the first support portion and the second support portion.

9. The image forming apparatus according to claim 1,
- wherein the metal member is fixed to the opening/closing portion.

10. The image forming apparatus according to claim 1,
- wherein the metal member is exposed to the outside of the apparatus main body in a case where the opening/closing portion is in the open position.

11. The image forming apparatus according to claim 1,
- wherein the metal member is electrically grounded.

12. The image forming apparatus according to claim 1,
- wherein the metal member covers at least a part of the opening in a case where the opening/closing portion is in the closed position.

13. The image forming apparatus according to claim 12,
- wherein in a case where the opening/closing portion is in the closed position and viewed in a moving direction of the moving member, a proportion of an area of the metal member to an area of the opening is 30% or more.

14. The image forming apparatus according to claim 1, wherein the image forming apparatus includes a photosensitive drum provided in the moving member or the cartridge, and wherein in a case where the moving member is located at the exposed position, the photosensitive drum is exposed downward, and the metal member faces the photosensitive drum.

15. The image forming apparatus according to claim 1, wherein the metal member is a metal plate.

* * * * *